United States Patent [19]

Woolley

[11] 3,882,670

[45] May 13, 1975

[54] TELEPHONE TIMER

[75] Inventor: Robert E. Woolley, Alameda, Calif.

[73] Assignee: Linda Bradbury, San Francisco, Calif.

[22] Filed: Aug. 6, 1973

[21] Appl. No.: 385,771

[52] U.S. Cl. ................................ 58/145 K; 58/39.5

[51] Int. Cl. ........................... G04b 5/20; G04f 3/06

[58] Field of Search ....... 58/39.5, 74, 145 K, 152 R, 58/152 T

[56] References Cited

UNITED STATES PATENTS

| | | | |
|---|---|---|---|
| 3,512,355 | 5/1970 | Lang | 58/39.5 |
| 3,648,454 | 3/1972 | Morrison | 58/50 R |
| 3,686,880 | 8/1972 | Samejima | 58/23 R |
| 3,738,099 | 6/1973 | Tanaka | 58/50 R |
| 3,789,600 | 2/1974 | Champan | 58/39.5 |

*Primary Examiner*—Edith Simmons Jackmon

*Attorney, Agent, or Firm*—Townsend and Townsend

[57] ABSTRACT

A timing and display unit for indicating a final interval of predetermined duration (e.g., 30 seconds) of each of a succession of toll charge intervals during a telephone call. A counting and control unit driven by a clock signal generator provides a succession of control signals which enable activation of a different one of a plurality of display lamps during each interval. When actuated, each lamp is pulsed by the clock signal generator to provide a flashing indicator for the duration of the final interval.

11 Claims, 3 Drawing Figures

TELEPHONE TIMER

BACKGROUND OF THE INVENTION

This invention relates to timing devices for providing a physical indication of predetermined time intervals. More particularly, this invention relates to devices for indicating time intervals of interest during the duration of telephone calls.

When a human operator is using the telephone, it is often desirable that the person be kept apprised of the duration of the telephone conversation. For example, when a toll call is placed for which the user is charged on the basis of time, it is normally desirable that the party initiating the toll call be kept apprised of the duration of the conversation as it progresses so that he may be continually apprised of the approximate cost of the call.

While many persons who use the telephone normally have a personal timepiece or access to a clock, many such persons neglect to note the exact time when the conversation begins. This makes it impossible to calculate the length of the total conversation span and thus, the cost of the call. Even when the exact starting time is noted, however, it frequently occurs that during the course of the conversation the user's attention is diverted in such a manner that the time at the end of the conversation span is not noted. In large offices, this inexact procedure results in substantial economic losses due to the lack of a noticeable reminder of the conversational time span which has already elapsed, and also due to the tendency of many persons to unnecessarily prolong conversations.

SUMMARY OF THE INVENTION

The invention comprises a timing and display unit for use with a telephone which provides a prominent, visible indication of the point in time at which the telephone conversation will exceed the telephone toll interval unless completed within a fixed final time interval, e.g., 30 seconds. The unit also updates this visible reminder for successive final intervals.

In the preferred embodiment, a plurality of individual indicator lamps are prominently mounted in a housing along with a plurality of manually actuatable control pushbuttons. Encased within the housing is electronic circuitry for energizing different ones of the individual lamps during the final time interval of different succeeding toll charge intervals, e.g. from 2.5–3.0 minutes, 3.5–4.0 minutes, etc.

The electronic circuitry includes a reference clock signal generator, a divide-by-N unit, a scale-of-N counter, a decoder for decoding predetermined counts in the scale-of-N counter and a lamp energizing circuit for intermittently flashing specified ones of the individual lamps in accordance with the decoder signals.

In operation, the user upon making connection with the called party actuates a first pushbutton which initializes the electronic circuitry. Thereafter, the scale-of-N counter is advanced at 30-second intervals by the clock signals divided down by the divider unit. When the counter reaches a first predetermined count of 2.5 minutes, the decoder generates a first control signal which enables the energizing circuit to intermittently flash a first lamp denoted by the visible legend 2.5 until 3.0 minutes have expired. When the counter reaches a second predetermined count of 3.5 minutes, the decoder generates a second control signal which enables the energizing circuit to intermittently flash a second lamp denoted by the visible legend 3.5 until 4.0 minutes have expired. Advance of the counter to further predetermined counts results in the sequential generation of other control signals which enable intermittent flashing of different individual ones of the remaining lamps to designate the final interval of subsequent toll charge intervals, e.g., 4.5–5.0 minutes, 5.5–6.0 minutes, etc.

Actuation of a second manual pushbutton by the operator at the end of a given telephone conversation freezes the count in the scale-of-N counter while permitting the electronic circuitry to continue to intermittently flash any lamp currently actuated. A manually actuatable pushbutton provides a manual reset for the counting unit.

For a fuller understanding of the nature and advantages of the invention, reference should be had to the following detailed description taken in conjunction with the accompanying drawings.

DESCRIPTION OF THE PREFERRED EMBODIMENT

Figure 1:
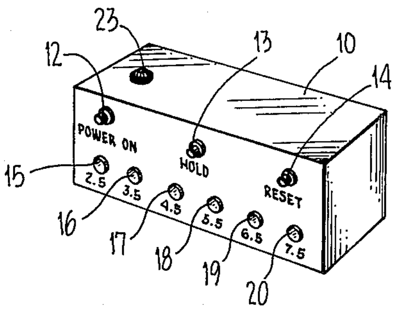
FIG. 1 is a perspective view of the preferred embodiment.

Turning now to the drawings, FIG. 1 illustrates the preferred embodiment of the invention. A housing 10 adapted to be placed near a telephone has three manually actuatable push-buttons 12, 13 and 14 labeled START, HOLD and RESET, respectively. A plurality of visible indicator lamps 15–20 are prominently arranged in a row on the front of housing 10. Immediately below each one of lamps 15–20 is a different numerical legend 2.5, 3.5, . . . , 7.5 for identifying the associated lamp in the manner described below. A power indicating lamp 21 is mounted adjacent START switch 12.

Figure 2:
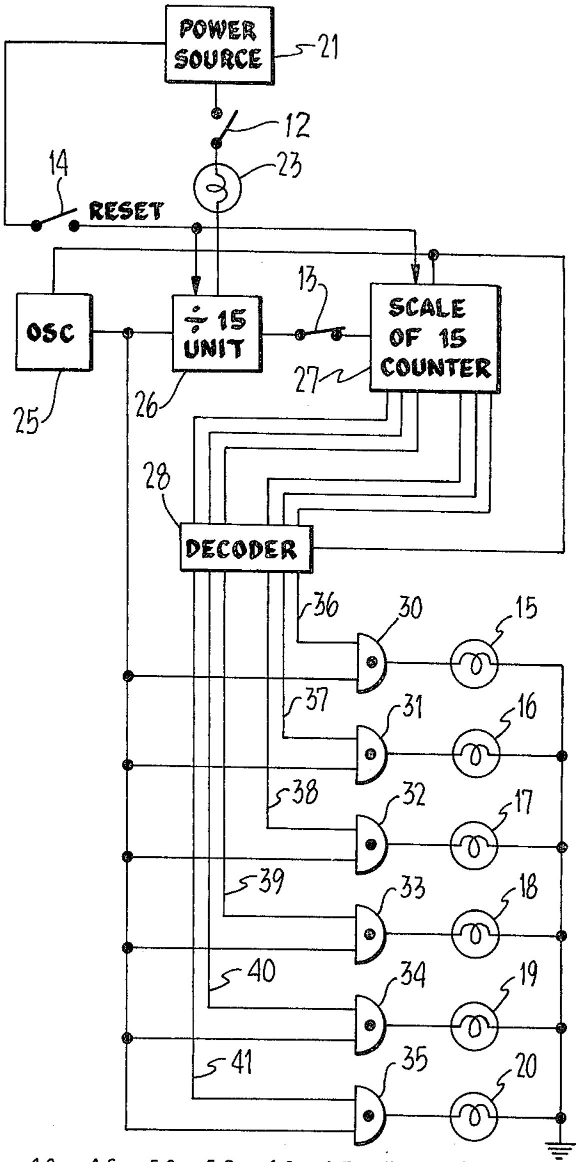
FIG. 2 is a schematic, block diagram of the electronic portion of the preferred embodiment of FIG. 1.

Housing 10 encloses the electronic circuitry shown diagrammatically in FIG. 2. A power source 21 is coupled by a start switch 12 and power indicator lamp 22 to an oscillator 25, a divide-by-15 unit 26, a scale-of-15 counter 27 and a decoder. Power source 21 may comprise any suitable source of voltage required to operate the various circuit elements shown, and in the preferred embodiment comprises a 6-Volt battery.

Oscillator 25 is coupled to the input of divide-by-15 unit 26 and is also coupled in parallel to a first input of each of a plurality of AND gates 30–35. In the preferred embodiment, oscillator 25 provides a continuous signal train having a period of 2 seconds when energized by source 21.

Figure 3:
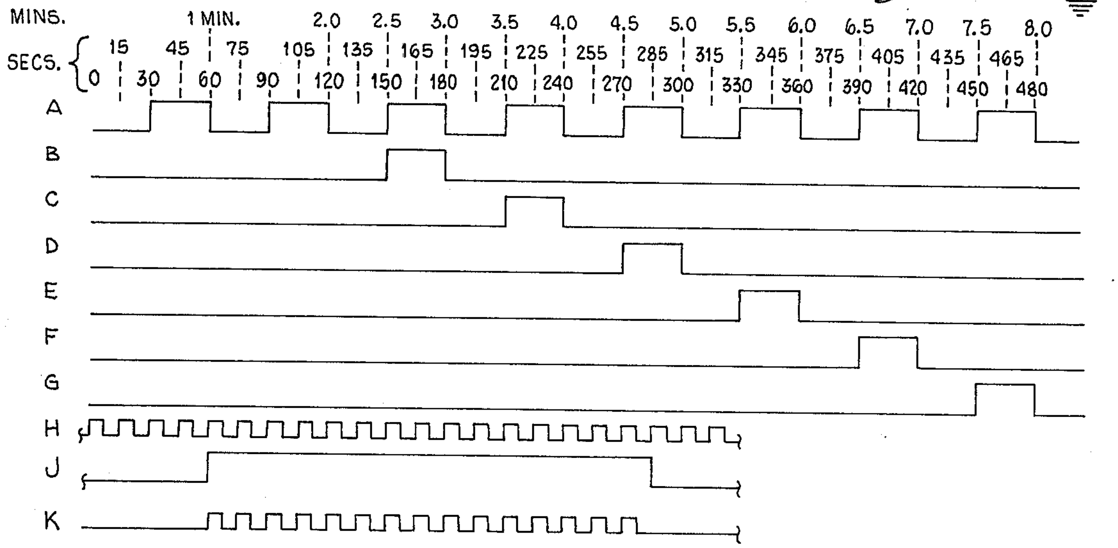
FIG. 3 is a waveform diagram serving to illustrate the operation of the preferred embodiment.

Conventional divide-by-15 unit 26 provides an output signal train illustrated by waveform A of FIG. 3 which comprises a square wave train having a period of 30 seconds and a half period of 15 seconds. The output of divide-by-15 unit 26 is coupled via normally closed HOLD switch 13 to the input of conventional scale-of-15 counter 27. Conventional scale-of-15 counter 27 is advanced by the trailing edges of the output signals from divide-by-15 unit 26 at 30-second intervals.

The individual stages of counter 27 are coupled to decoder 28. Decoder 28 is a conventional unit, e.g., a type SN74145 binary decoder, which provides serially appearing control signals on leads 36–41 in response to the advance of counter 27 to predetermined counts. Since counter 27 ordinarily remains at a given count for 30 seconds, each control signal on leads 36–41 persists for 30 seconds. These control signals are illustrated by waveforms B–G, respectively, of FIG. 3 and comprise square wave pulses, each of 30 second duration, waveform B beginning 2.5 minutes after the initialization of the FIG. 2 circuitry in the manner described below, and waveforms C–G beginning at 60-second intervals thereafter, as shown. Thus, waveforms B–G delineate final intervals each of 30 seconds duration of the standard toll charge intervals 0-3.0 minutes, 3.0–4.0 minutes, 4.0–5.0 minutes, 5.0–6.0 minutes, 6.0–7.0 minutes, and 7.0–8.0 minutes, respectively. Leads 36–41 are coupled to the remaining input of respective ones of individual AND gates 30–35. Thus, when a control signal is present on any one of control leads 35–41, the corresponding AND gate enables oscillator 25 to actuate the corresponding one of indicator lamps 15–20.

Waveforms H, J and K illustrate the manner in which the individual indicator lamps are energized in the preferred embodiment. These waveforms are greatly enlarged relative to waveforms A–G and represent the output of oscillator 25, a typical one of control signals B–G, and a typical output signal from AND gates 30–35, respectively. Initially, with the control signal absent (low), the AND gate is disabled and clock signal H is blocked. When the control signal is present (high), the AND gate is enabled and clock signal H passes therethrough until the end of the final interval delineated by control signal J. A 0.5 Hz. signal is thus applied to the associated indicator lamp, and the lamp is energized for substantially 50 percent of the two-second period of each cycle of waveform K. As a result, each lamp is intermittently flashed for 15 periodic cycles, each cycle having a 1-second ON time and a 1-second OFF time.

In operation, when the called party has been first contacted, the operator manually actuates START pushbutton 12, thereby energizing the FIG. 2 circuitry. Divide-by-15 unit 26 proceeds to divide down the output clock signals from oscillator 25 to a train of pulses having a period of 30 seconds. This train is applied via normally closed HOLD switch 13 to the input of scale-of-15 counter 27 which is incremented from an initial count once every 30 seconds. When counter 27 has been advanced to a count representing the final interval 2.5–3.0 minutes of the first toll charge interval 0–3.0 minutes, decoder 28 generates control signal B on lead 36 which enables AND gate 30. The output of oscillator 25 is thereafter utilized to energize indicator lamp 15, which is pulsed at the 0.5 Hz. rate in the final interval from 2.5–3.0 minutes. When control signal B on lead 36 terminates at 3.0 minutes from the start of timing, lamp 15 is extinguished.

When counter 27 has been advanced to a count representing the final interval 3.5–4.0 minutes of the second toll charge interval 3.0–4.0 minutes, decoder 28 generates control signal C on lead 37, thereby enabling AND gate 31 and permitting the pulse energization of indicator lamp 16 in the final interval from 3.5–4.0 minutes in the manner described above. When control signal C on lead 37 terminates 4.0 minutes from the start of timing, lamp 16 is extinguished. Lamps 17–20 are sequentially energized in a similar manner by control signals D–G on decoder output leads 38–41 to delineate the final interval of the succeeding toll charge intervals 4.0–5.0, 5.0–6.0, 6.0–7.0, and 7.0–8.0 minutes, respectively. Upon termination of the telephone conversation, the operator depresses the HOLD pushbutton 13 which opens the circuit path between divide-by-15 unit 26 and scale-of-15 counter 27, thereby preventing incrementing of the latter element. If counter 27 at this time holds a count representing one of the final intervals, the corresponding indicator lamp continues to flash intermittently, thereby providing a prominently visible indication of the total conversational span of the call. If the call terminates during the initial interval of a toll charge interval, so that no lamp is then energized, the operator releases the HOLD pushbutton 13, which re-establishes the circuit path between divide-by-15 unit 26 and counter 27, without disturbing the count in counter 27. When unit 26 generates a succeeding output pulse, counter 27 is advanced to a count representing a final interval and the corresponding indicator lamp is energized, thereby providing the visible indication of the total conversational span of the call. The operator may then record the total toll charge intervals or units consumed by the telephone call, after which START switch 12 is opened, thereby terminating operation of the system.

If several telephone calls, each of a short duration, are to be made seriatim after termination of the first call and the total charge intervals consumed by that call have been noted or recorded, the operator may proceed by establishing the second telephone connection while maintaining the system in the hold mode. When the second called party is contacted, the operator momentarily then actuates RESET pushbutton 14, which couples an enabling voltage to the reset inputs of divide-by-15 unit 26 and scale-of-15 counter 27, thereby reseting these elements to the initial state. Operation may then proceed in the manner described above.

The circuitry of FIG. 2 may be implemented in alternate ways known to those skilled in the art. For example, conventional divide-by-16 counters, such as SN7493 counters may be utilized for both unit 26 and counter 27, and the frequency of oscillator 25 may be adjusted in a known way so that counter 27 is incremented once each 30 seconds. Further equivalent arrangements will occur to those skilled in the art.

As will now be apparent, the invention provides a compact, inexpensive timing and display unit especially adapted for use in timing telephone toll calls. Actuation of the individual warning lamps for a first or final interval beginning 30 seconds before the end of the individual toll charge intervals enables the telephone user to finish a conversation just before the beginning of another toll period. By thus avoiding unnecessary spill-over into the beginning of a subsequent toll period, substantial savings in telephone toll charges may be effected.

While the foregoing provides a full and complete disclosure of the preferred embodiment of the invention, various modifications, alternate constructions and equivalents may be employed without departing from the true spirit and scope of the invention. For example, the system may be designed with final intervals of a different duration and toll charge intervals of a different sequential spacing and duration according to the requirements of a given application. Accordingly, the above description and illustrations should not be construed as limiting the scope of the invention which is defined by the appended claims.

What is claimed is:

1. A telephone timing and display unit for providing an indication of a final interval of predetermined duration of each of a number of toll charge intervals during a telephone call, said unit comprising:

clock means for providing a reference clock signal train;

means for generating a succession of final interval signals of predetermined duration from said reference clock signal train, each succeeding final interval signal beginning a fixed time interval after the end of the previous final interval signal;

manually actuatable means for initializing said generating means at the beginning of said telephone call;

a plurality of display lamps, each for specifying a different one of said final intervals; and means for energizing a different one of said lamps at a rate related to said clock signal train for each of said final intervals in response to the generation of each of said final interval signals so that each of said lamps is intermittently energized only during the final portion of a different toll charge interval.

2. The apparatus of claim 1 further including manually actuatable hold means for enabling said generating means to continue to generate any one of said final interval signals present upon actuation of said hold means so that the associated one of said display lamps continues to be intermittently energized when the hold means is actuated at the end of a telephone call.

3. The apparatus of claim 1, wherein said generating means includes means for producing the first of said final interval signals substantially 2.5 minutes after initialization of said generating means.

4. The apparatus of claim 1, wherein said fixed time interval is substantially one minute.

5. The apparatus of claim 1, wherein said generating means includes a divide-by-N unit coupled to said clock means, a scale-of-N counter coupled to the output of said divide-by-N unit, where N=the time duration of said fixed time interval divided by four and a decoder coupled to said scale-of-N counter for generating each of said final interval signals in response to the generation of a different predetermined count in said scale-of-N counter.

6. The apparatus of claim 5, wherein N=15.

7. A timer for indicating the duration of each of an ordered plurality of significant intervals, each succeeding interval beginning a fixed time interval after the end of the previous interval, said timer comprising:

means for generating a reference train of clock signals having a predetermined frequency;

counting and control means coupled to said generating means for providing a plurality of control signals, each defining a different one of said significant intervals;

manually actuatable means for setting said counting and control means to an initial state;

a plurality of indicator lamps coupled to said counting and control means, each said lamp associated to a different one of said significant intervals; and lamp energizing means coupled to said generating means and said counting and control means for sequentially energizing said individual lamps at a rate determined by said clock signals in accordance with the appearance of individual ones of said control signals so that each of said individual lamps is intermittently energized only during the significant interval associated thereto.

8. The apparatus of claim 7, wherein said counting and control means includes a divide-by-N unit coupled to said generating means, a scale-of-N counter coupled to the output of said divide-by-N unit, where N=the time duration of said intervals divided by two, and a decoder coupled to said scale-of-N counter for generating each of said control signals in response to the generation of a different predetermined count in said scale-of-N counter.

9. The apparatus of claim 8, wherein N=15.

10. The apparatus of claim 8 further including manually actuatable means for disabling said scale-of-N counter from further counting in order to store the count therein.

11. The apparatus of claim 7, wherein said intervals are each of substantially 30 seconds duration and mutually separated by 60 seconds, the first one of said intervals beginning substantially 2.5 minutes after said counting and control means has been set to said initial state.

* * * * *